US011661766B2

(12) United States Patent
Al-Kahwati et al.

(10) Patent No.: US 11,661,766 B2
(45) Date of Patent: May 30, 2023

(54) WIRELESS ULTRA-LOW POWER PORTABLE LOCK

(71) Applicant: Velo Labs, Inc., San Francisco, CA (US)

(72) Inventors: Jack Al-Kahwati, San Francisco, CA (US); Gerardo Barroeta Perez, San Francisco, CA (US)

(73) Assignee: VELO LABS, INC., San Francisco, CA (US)

(*) Notice: Subject to any disclaimer, the term of this patent is extended or adjusted under 35 U.S.C. 154(b) by 0 days.

(21) Appl. No.: 17/340,354

(22) Filed: Jun. 7, 2021

(65) Prior Publication Data

US 2021/0404215 A1 Dec. 30, 2021

Related U.S. Application Data

(63) Continuation of application No. 16/710,737, filed on Dec. 11, 2019, now Pat. No. 11,028,617, which is a (Continued)

(51) Int. Cl.
*H04N 5/44* (2011.01)
*E05B 47/00* (2006.01)

(Continued)

(52) U.S. Cl.
CPC ...... *E05B 47/0012* (2013.01); *E05B 47/0004* (2013.01); *E05B 67/063* (2013.01);

(Continued)

(58) Field of Classification Search
CPC ............ E05B 47/0012; E05B 47/0004; E05B 67/063; E05B 47/0603; E05B 47/0607;

(Continued)

(56) References Cited

U.S. PATENT DOCUMENTS 5,387,903 A 2/1995 Cutter et al.
5,517,189 A 5/1996 Bachhuber et al.

(Continued)

FOREIGN PATENT DOCUMENTS

DE 20016899 U1 12/2000
DE 202004001522 U1 4/2004

(Continued)

OTHER PUBLICATIONS

Response to Patent Proprietor's Reply to Notice of Opposition dated Jul. 20, 2021 received in related European Patent No. 3004495 (28 pages).

(Continued)

*Primary Examiner* — Munear T Akki
(74) *Attorney, Agent, or Firm* — Wilmer Cutler Pickering Hale and Dorr LLP

(57) ABSTRACT

A wireless ultra-low power portable lock may be realized as a lock apparatus including: a locking mechanism having at least locked and unlocked states, the locking mechanism operable to provide physical resistance to being unlocked when in the locked state; an actuator operable to move the locking mechanism from the locked state to the unlocked state in response to a received signal; and a controlling unit configured to control the actuator and to receive one or more signals from one or more devices external to the lock apparatus.

20 Claims, 21 Drawing Sheets

Related U.S. Application Data continuation of application No. 16/387,462, filed on Apr. 17, 2019, now Pat. No. 10,526,814, which is a continuation of application No. 14/271,963, filed on May 7, 2014, now Pat. No. 10,378,241.

(60) Provisional application No. 61/832,316, filed on Jun. 7, 2013.

(51) Int. Cl.
*G07C 9/00* (2020.01)
*E05B 67/06* (2006.01)
*E05B 47/06* (2006.01)

(52) U.S. Cl.
CPC ...... *G07C 9/00571* (2013.01); *E05B 47/0603* (2013.01); *E05B 47/0607* (2013.01); *E05B 2047/0094* (2013.01); *E05B 2047/0095* (2013.01); *G07C 2009/00634* (2013.01); *G07C 2209/08* (2013.01); *G07C 2209/62* (2013.01); *Y10T 70/40* (2015.04)

(58) Field of Classification Search
CPC ..... E05B 2047/0094; E05B 2047/0095; G07C 9/00571; G07C 2009/00634; G07C 2209/08; G07C 2209/62; Y10T 70/40
See application file for complete search history.

(56) References Cited

U.S. PATENT DOCUMENTS

| | | | | |
|---|---|---|---|---|
| 6,012,309 | A | 1/2000 | Liu | |
| 6,046,558 | A | 4/2000 | Larson et al. | |
| 6,584,815 | B2 | 7/2003 | Bremicker | |
| 6,761,051 | B1 | 7/2004 | Tsai | |
| 8,331,544 | B2 * | 12/2012 | Kraus | H04L 12/2836 340/5.71 |
| 8,482,411 | B1 | 7/2013 | Brown | |
| 8,839,650 | B2 | 9/2014 | Zuraski | |
| 9,260,885 | B2 | 2/2016 | Asquith et al. | |
| 9,842,446 | B2 * | 12/2017 | Vecchiotti | G07C 9/20 |
| 10,246,905 | B2 | 4/2019 | Al-Kahwati et al. | |
| 10,378,241 | B2 | 8/2019 | Al-Kahwati et al. | |
| 10,526,814 | B2 | 1/2020 | Al-Kahwati et al. | |
| 11,028,617 | B2 | 6/2021 | Al-Kahwati et al. | |
| 2003/0218536 | A1 | 11/2003 | Linden et al. | |
| 2004/0134242 | A1 | 7/2004 | Wyers | |
| 2005/0199019 | A1 | 9/2005 | Marcelle et al. | |
| 2006/0179057 | A1 | 8/2006 | Moretti | |
| 2007/0240464 | A1 | 10/2007 | Miller et al. | |
| 2008/0024272 | A1 | 1/2008 | Fiske | |
| 2008/0078213 | A1 | 4/2008 | Adcock | |
| 2008/0094192 | A1 | 4/2008 | Dutt | |
| 2008/0223088 | A1 | 9/2008 | Yang | |
| 2009/0183541 | A1 * | 7/2009 | Sadighi | G07C 9/00309 70/320 |
| 2009/0282876 | A1 | 11/2009 | Zuraski et al. | |
| 2010/0033327 | A1 | 2/2010 | Kao | |
| 2010/0332359 | A1 | 12/2010 | Powers et al. | |
| 2011/0265526 | A1 | 11/2011 | Zuraski | |
| 2011/0285528 | A1 | 11/2011 | Weinstein et al. | |
| 2011/0311052 | A1 * | 12/2011 | Myers | H04L 63/10 380/270 |
| 2012/0011902 | A1 | 1/2012 | Meekma | |
| 2012/0126978 | A1 * | 5/2012 | Kellen | G08B 5/36 340/541 |
| 2012/0133482 | A1 | 5/2012 | Bhandari et al. | |
| 2012/0169461 | A1 | 7/2012 | Dubois, Jr. | |
| 2012/0249327 | A1 | 10/2012 | Kofford et al. | |
| 2013/0043973 | A1 | 2/2013 | Greisen et al. | |
| 2013/0055773 | A1 | 3/2013 | Li | |
| 2013/0069760 | A1 | 3/2013 | Lickfelt | |
| 2013/0335193 | A1 | 12/2013 | Hanson et al. | |
| 2014/0085087 | A1 * | 3/2014 | Alnadwi | G07C 9/20 340/5.32 |
| 2014/0157838 | A1 | 6/2014 | Nave | |
| 2014/0218167 | A1 | 8/2014 | Tseng | |
| 2014/0266588 | A1 | 9/2014 | Majzoobi | |
| 2014/0360232 | A1 | 12/2014 | Al-Kahwati et al. | |

FOREIGN PATENT DOCUMENTS

| | | | |
|---|---|---|---|
| DE | 202008010350 | U1 | 12/2008 |
| DE | 102009043873 | A1 | 3/2011 |
| EP | 0668422 | A1 | 8/1995 |
| WO | WO-95/05515 | A1 | 2/1995 |
| WO | WO-98/28509 | A1 | 7/1998 |
| WO | WO-2009/0158326 | | 12/2009 |
| WO | WO-2013/078561 | | 6/2013 |
| WO | WO-2014/029774 | | 2/2014 |

OTHER PUBLICATIONS

Summons to attend oral proceedings pursuant to Rule 115(1) EPC, dated Aug. 26, 2021, received in related European Patent No. 3004495 (27 pages).
International Search Report and Written Opinion issued by the U.S. Patent and Trademark Office as International Searching Authority for International Application No. PCT/US2014/037101 dated Nov. 13, 2014 (11 pages).
European Extended Search Report issued in EP14806848.9, dated Mar. 14, 2017 (12 pages).
Extended European Search Report dated Dec. 22, 2017 received in related European Patent Application No. 17187521.4 filed May 7, 2014 (8 pages).
Notice of Opposition dated Oct. 8, 2020 received in related European Patent Application No. 14806848.9 (64 pages).
Communication received from the European Patent Office received in related European Patent Application No. 17187521.4 dated Jun. 8, 2021 (9 pages).

* cited by examiner

WIRELESS ULTRA-LOW POWER PORTABLE LOCK

CROSS-REFERENCE TO RELATED APPLICATION

This application is a continuation of U.S. application Ser. No. 16/710,737, filed on Dec. 11, 2019, which is a continuation of U.S. application Ser. No. 16/387,462, filed on Apr. 17, 2019, now U.S. Pat. No. 10,526,814, which is a continuation of U.S. application Ser. No. 14/271,963, filed on May 7, 2014, now U.S. Pat. No. 10,378,241, which claims benefit under 35 U.S.C. § 119(e) of U.S. Provisional Patent Application No. 61/832,316, entitled "Wireless Ultra-Low Power Portable Lock," filed on Jun. 7, 2013, the disclosures of which are expressly incorporated by reference herein in their entirety.

TECHNICAL FIELD

This application relates generally to portable locks, and more specifically to a system for wireless management of a portable locking device.

BACKGROUND

Bicycle theft is a big problem. In the USA 1.5 million bikes are stolen every year representing a loss of about $350 million. Bike theft is also a crime that largely goes unpunished.

SUMMARY

Embodiments of the invention comprise a wirelessly controlled electronic portable lock apparatus that might be used to secure objects such as bicycles or the like. The lock apparatus is locked and unlocked via a mechanism actuated by an electromechanical device such as an electric motor, solenoid, servo motor, stepping motor or the like. The actuator is controlled by an electronic element such as a microcontroller, which itself acts based on information received remotely via a wireless link. The wireless link can be established via an antenna, although not necessary, and the antenna can be connected to an electronic radio or similar device. The nature of the wireless link can take many forms such as far field or near field thus covering the range spanned from NFC devices to devices such as radios. All electric, electromechanical, and electronic elements are powered through a battery, which can be rechargeable, placed inside the body of the lock.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION OF THE INVENTION

Figure 1:
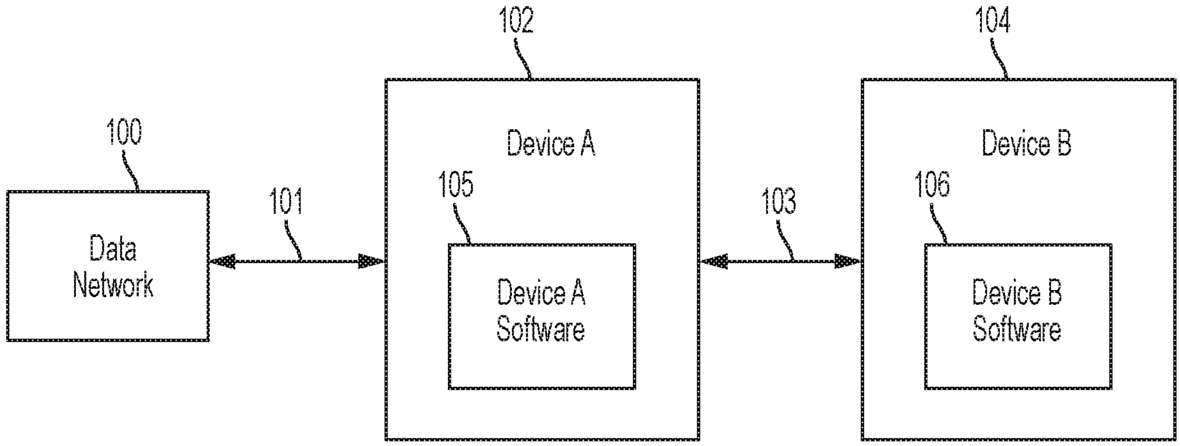
FIG. 1 is a block diagram of a system according to an embodiment of the present invention.

The overall system may include several high-level elements that work together to enable the functionality described herein. Referring to FIG. 1, the high level architecture is composed by a data network (100), a data network link (101), a device A (102), a wireless link (103), a device B (104), device B software (105), and device A software (106).

The data network (100) will be understood to include network elements such as are often referred to as "cloud computing". The data network (100) includes back-end storage, processing, and computing equipment that is located remotely. It is composed of data network services, such as cell phone towers, cell phone base stations, antennas, computing equipment etc. It also includes the computing equipment of cloud computing services such as Amazon, Rackspace, Microsoft etc. This element may also include web hosting services, back-end services, storage and backup Services, databases, software and computing processes, etc. The purpose of the data network is to provide the infrastructure necessary to carry out many of the functions described in this patent and others that are not yet disclosed.

A data network link (101) refers to the physical and logical connection that is established between device A and the data network. This link can be made either through wireless or connected means. Some examples are Ethernet networks, Wi-Fi links, GPRS/EDGE/3G/4G, and other cell phone services. The purpose of the link is to connect device A to the data network to enable services and operations to function properly. It is possible to operate device A in the absence of the data link, but the data link may be useful to enable many of the features of embodiments of the invention.

Device A (102) is an electronic device that works as an interface to control the wireless lock. Device A may be represented by many different devices. Some examples include cellular phones, smart phones, media devices such as MP3 media players, pagers, portable computers, personal computers, tablet computers, personal digital assistants, wearable computers such as smart glasses, bracelets, necklaces and others. Device A includes all the elements necessary to make device A function and include but are not limited to their power supplies such as batteries, firmware, application software, display, interface elements as sensors and buttons, cases, drives, etc. A purpose of device A is to control the wireless lock and to provide feedback to the user and the control software about the state of different variables and subsystems of the wireless lock. Device A accomplishes this through one or many types of device A software (105).

Device A software (105) can take many forms depending on the embodiment of device A and can be represented by application software or "apps", web browsers, specialized software or firmware, etc. Device A software (105) has several main functions:

To effect changes on device B

To monitor the state of device B

To provide an interface for users

To authenticate and validate authorized users

To interface functions of the lock between device B and the data network

To notify users of changes in states of the lock

To store information regarding device B

To communicate with the data network

Users can be either other software elements or people. Device A software will communicate to device B (104), which is the wireless lock, through a wireless link (104).

The wireless link (103) is the interface between device A and device B. This link can take many forms depending on the technology used but can be any version of Bluetooth including Bluetooth low energy, or other technologies such as Wi-Fi, near field communications (NFC), ZigBee, ANT, etc.

Figure 2:
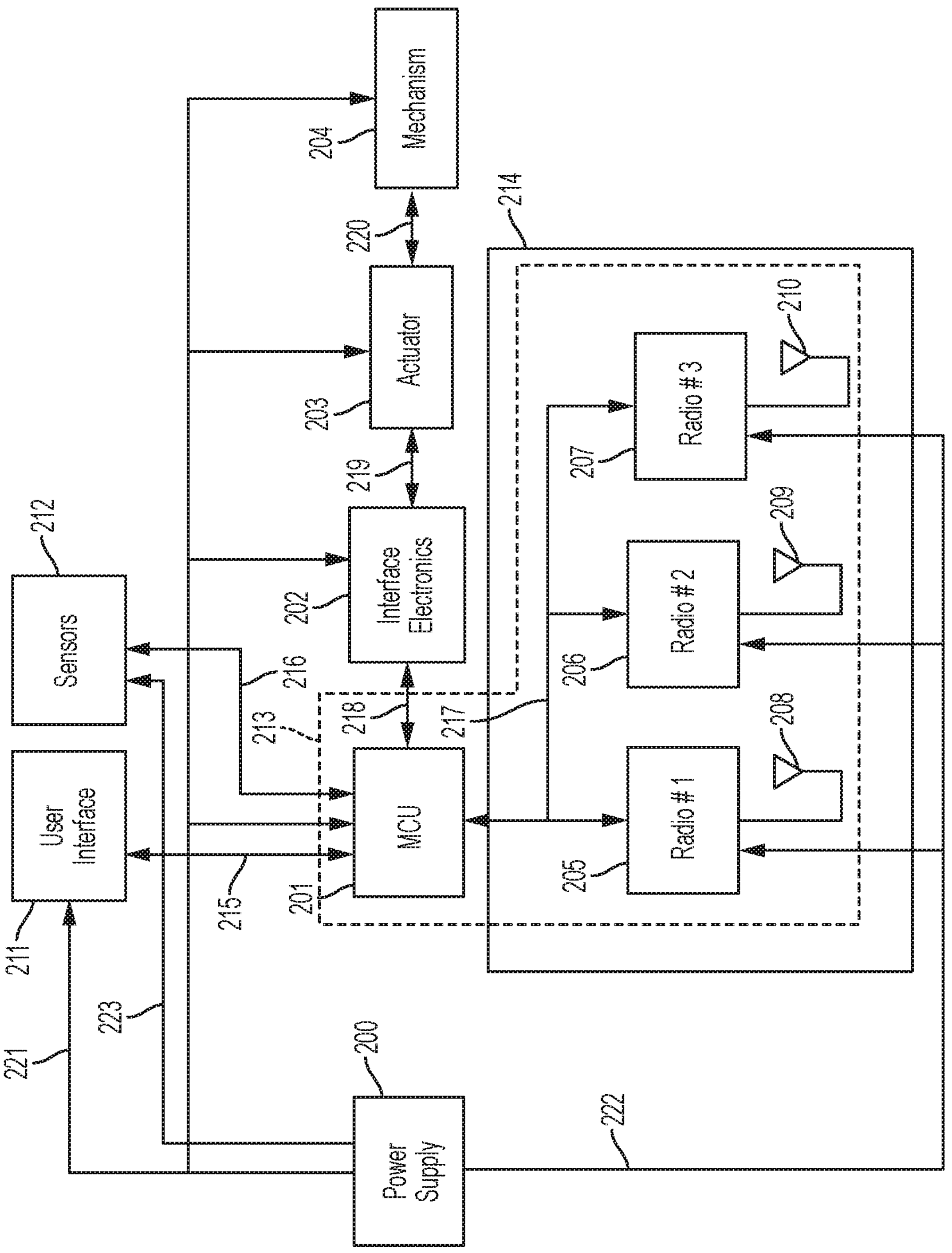
FIG. 2 is a block diagram of the hardware elements of a device according to an embodiment of the present invention.

Device B (104) refers to the wireless lock. The wireless lock comprises several subsystems as shown in FIG. 2. Device B encompasses both the hardware and software components necessary to make the lock operate as described. The hardware of the lock is made up of the mechanical and electrical components necessary to make it operate as described. The device B software (106) involves all of the firmware, applications and the like, that operate in the device. The device B software is in charge of:

Controlling the mechanisms of the lock

Controlling the radios

Storing information

Interfacing between component elements

Controlling user interface features such as LEDs

Monitoring the state of the battery

Reporting characteristics back to Device A

Providing a secure digital connection through encryption

The electrical subsystem of the lock can be described as all the electrical and electronic elements used to operate the device, and includes, but is not limited to: one or many electromechanical components, such as electric motors, solenoids, relays, or the like; one or multiple radios, one or many antenna matching circuits, one or many antennas, a controlling unit that interfaces the radio to the electric motors (directly or indirectly) such as a microcontroller, microprocessor or other device; the necessary passive and active electric and electronic elements such as resistors, inductors, capacitors, transistors, diodes etc, that might be necessary to interface the previously mentioned elements to each other.

An example of a high-level electrical diagram can be seen in FIG. 2. It is composed of a power supply block (200), an MCU (201), interface electronics (202), an actuator (203), a mechanism (204), radios #1,2,3 (205, 206, 207), user interface elements (211), sensors (212), and system buses (215, 216,217,218,219,220,221,222,223).

The MCU (201) refers to a microcontroller, microprocessor or similar device that executes the code necessary to run some or all of the tasks of the subsystem. The MCU can be either a stand-alone device or be integrated into a radio unit/module as shown by dotted line (213). If the radio and MCU units are separate, they can communicate through a radio bus (217). Radios could be one or many of equal or different technologies and can be stand-alone or combined into a single piece of silicon or module as indicated by the FIG. (214); some examples of combined radio chipsets are dual mode Bluetooth (BT 2.0 and BT 4.0), dual Wi-Fi/Bluetooth and others. User interface block (211) represents electronic user interface devices such as LED lights, pager motors for haptic feedback and others. The user interface block (211) may further include any display elements such as digital or analog displays, monitors, dials, or any other read-outs to provide information to the user. Sensors (212) refers to any type or combination of sensing technologies such as reed switches, hall effect sensors, magnetometers, accelerometers, gyroscopes, impedance sensors, resistance sensors capacitance sensors, inductive sensors, voltage sensors and similar. Interface electronics (202) refers to amplifiers, transistors and other electronic elements necessary to help a radio or MCU unit control the electromechanical actuator (203) through connections (218, 219, 220). Actuator (203) refers to an electromechanical element that will actuate the locking/unlocking mechanism and can be any combination of electric motors, servo motors, solenoids, magnetic actuators, piezoelectric actuators, and similar devices. Mechanism (204) refers to the mechanical elements that are necessary to make the lock work, including cables, pulleys, levers, springs, pawls, pins, gears, racks, and similar.

Figure 3:
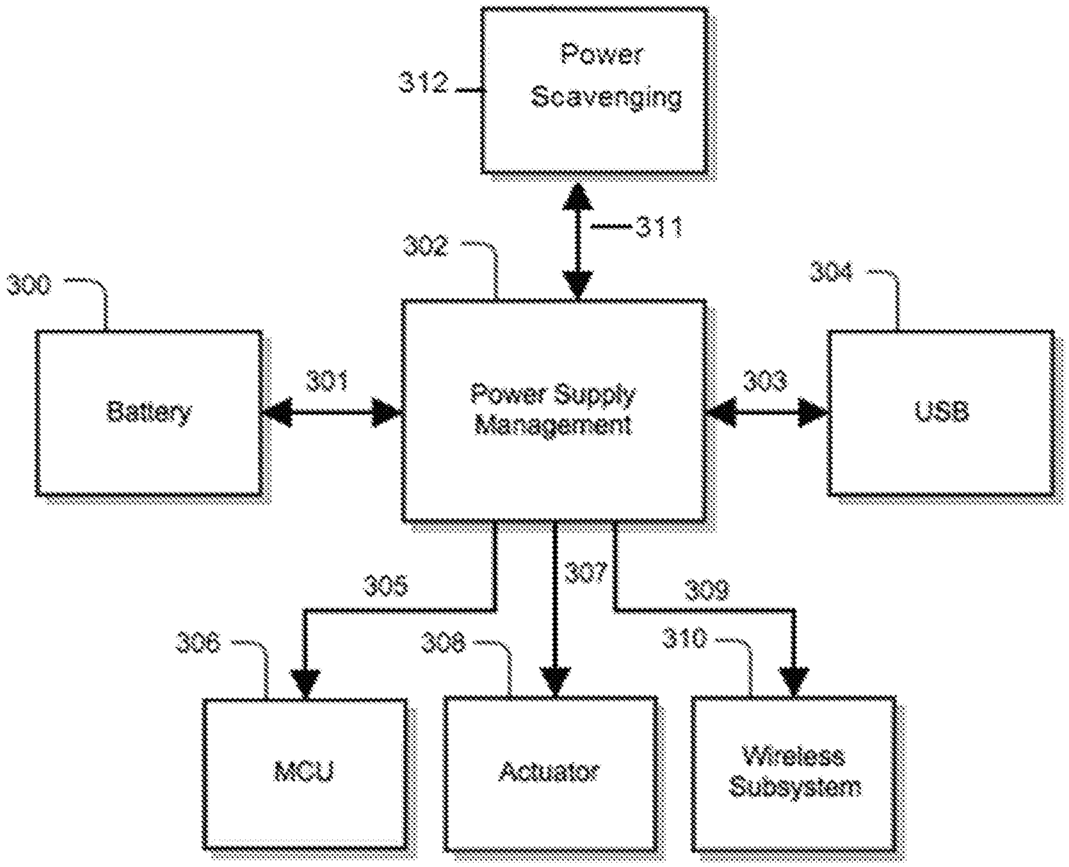
FIG. 3 is a block diagram of further elements of the device of FIG. 2.

The power supply block from FIG. 2 (200) provides power to the system. This block is further broken down in FIG. 3. A power supply management module (302) may be in electrical communication with various elements via electrical connections (301, 303, 305, 307, 309, 311) through which it draws and/or provides energy. The module (302) may have access to one or more batteries (300), capacitors, super capacitors, power cells or the like for energy storage. The system may further include linear regulators, inverters, switched mode power supplies (such as buck and/or boost controllers), DC/DC voltage switchers, and the like. The system may further include a serial connection (304) through which it may draw power from a conventional power source. The energy storage elements (300) can be recharged via the serial connection (304), or completely sourced from it. It can also be trickle charged by power scavenging techniques which include solar panels, vibration generators, piezoelectric or inductive sources, or any other power scavenging units (312). As shown, the power supply management module (302) may regulate power provided to the MCU (306), actuator (308), and wireless subsystem 310 of device B.

Embodiments of the invention include the software elements used to operate the lock. The software in device B, the wireless lock, embodies any firmware, applications, code, pseudo-code, and similar used to make the radio and or controlling unit function. The software component in device A comprises applications, browsers, web applications, code, parts of code, firmware, user interfaces, human computer interaction elements, buttons, controls and similar needed to take input from persons, other software, devices, websites, real or virtual entities, databases, cloud systems and servers, and the like. That input may be turned into actionable wireless signals, status reports, tests, and others used to remotely control, monitor and interact with the elements in device B such as the locking mechanism. The software in the remote server/data network component includes application software that runs in a remote location, such as a cloud computing environment or remote servers. This may include databases, security code, data processing applications, storage/backup processes, and systems or similar.

Figure 4A:
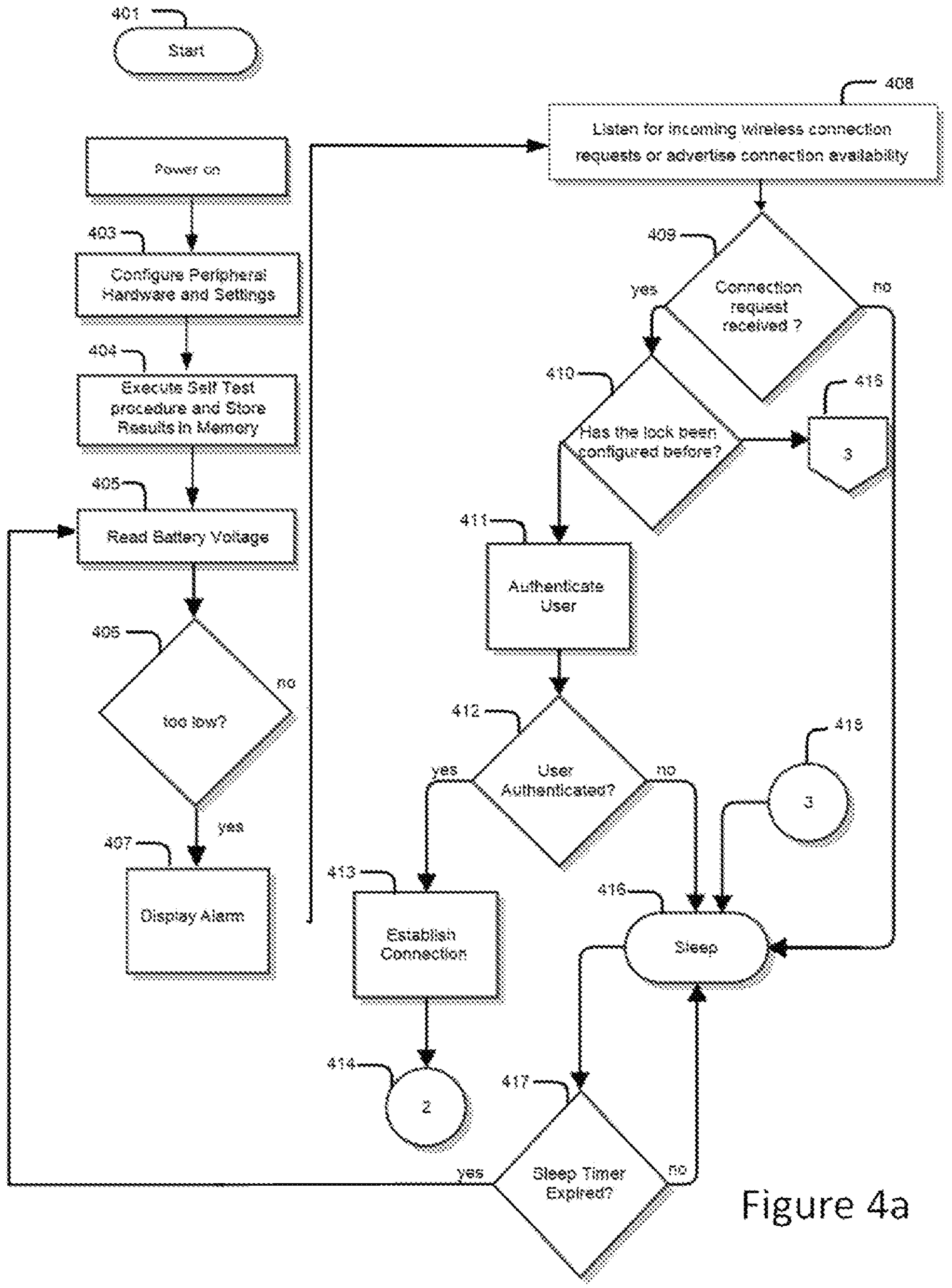
FIGS. 4*a* and 4*b* are flowcharts illustrating a method for operating a device in accordance with an embodiment of the present invention.
Figure 4B:
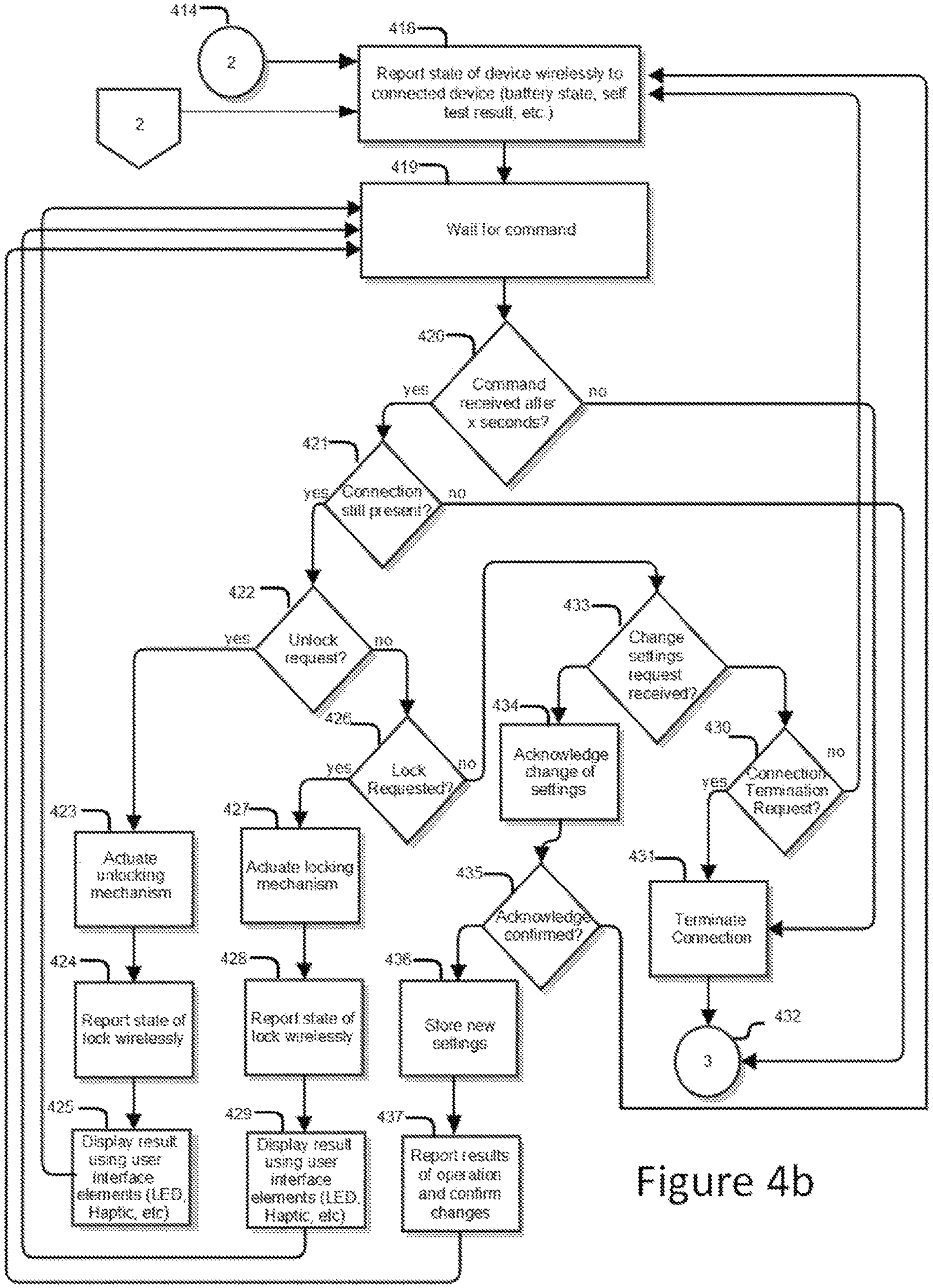

An example flow chart for software associated with device B can be seen in FIGS. 4*a* and 4*b*. As illustrated in FIG. 4*a*, software may start (401) at power up (402), then proceed to configure hardware and software peripherals, environment variables, software structures, clocks, timers, etc. (403). After configuration, the software proceeds to execute a self-test procedure (404), which is useful to report the state of the lock and its variables and functions back to a user. Self-test is also useful during the design and manufacturing stages as it allows for quicker inspection of potential problems. Once the self-test procedure is complete, the software can store the results into memory for later inspection or reporting. The software may then read the state of the battery (405) and alert the user (407) through output elements such as LEDs or motors if (406) the battery needs to be recharged. After this, the software may either listen to or advertise RF connections depending on the wireless technology, for a set amount of time (408). If no connection requests are received, the device may go to low power sleep (416). If a connection request is received (409), the software checks whether it has been previously configured or not, either because it is new or because it has been reset to factory state. In the case that it has not been configured before, the firmware may notify the application software, and go into an initial configuration state (415, see FIG. 5). If, on the other hand, the lock has been previously configured (410), the software may authenticate the user (411) and establish a connection (413) only if (412) the user was successfully authenticated, otherwise, the software goes into sleep mode (416). In a different scenario, the software may allow anyone to connect but not perform any functions until the user is authenticated. In the case that no connection requests are received after a set amount of time, the software may be put into sleep mode. A timer may wake up the system after a sleep timer expires (417), thus saving power. Once the sleep timer expires, the software goes back to reading the battery voltage and restarting the connection process (405).

In the case where a connection is successfully established (414), as illustrated in FIG. 4*b*, the software may then report the state of the battery, peripherals, and self-test results back to a device A through a wireless link (418). The software then waits for any instructions (419) for a set amount of time, and if no instructions are received after a configurable amount of time (420), the connection may be terminated (431) and go to sleep to save power (432 to FIG. 4*a*). If an instruction is received, however, then a check for connection state is performed (421); this may be done to prevent any unlocking or sensitive functions if the user is outside of the wireless radio range. Before performing any or some of those functions, the software can re-authenticate the user to ensure no un-authorized access and manipulation of the lock. In case an unlock instruction is received (422), the lock actuates the mechanism and provides user feedback (423, 424,425). In some versions of the lock and depending on the locking mechanism, a locking instruction might be needed (426,427,428,429) in which case the lock actuates the locking mechanism and displays a result. In some implementations, the device may further check for a change of settings request (433), and may acknowledge a change of settings (434) and prompt a user for confirmation of the settings change (435). The new settings may only be stored and reported if the change is confirmed (436, 437). Another instruction may be to report the state of the lock variables such as battery charge, voltage levels, usage statistics, and others. Since the connection between device A and the wireless lock is wireless, in some embodiments, the software could check the state of the connection regularly. The device A may also check to see if a request to terminate the connection has been received (430) and terminate the connection if so (431).

In other potential scenarios, the wireless connection between device A and the wireless lock could be established automatically, making it transparent to the user. In such cases, the lock authentication and handshake process could be established as soon as the user and the lock are within the range of the wireless radio. The user could then potentially open the lock simply by pressing a button in the lock, or by actuating a sensor. This could be a capacitive touch sensor, a photodiode, ambient light sensor, accelerometer or others. The user could also open the lock based on the proximity of the radio as measured by different techniques.

Figure 5:
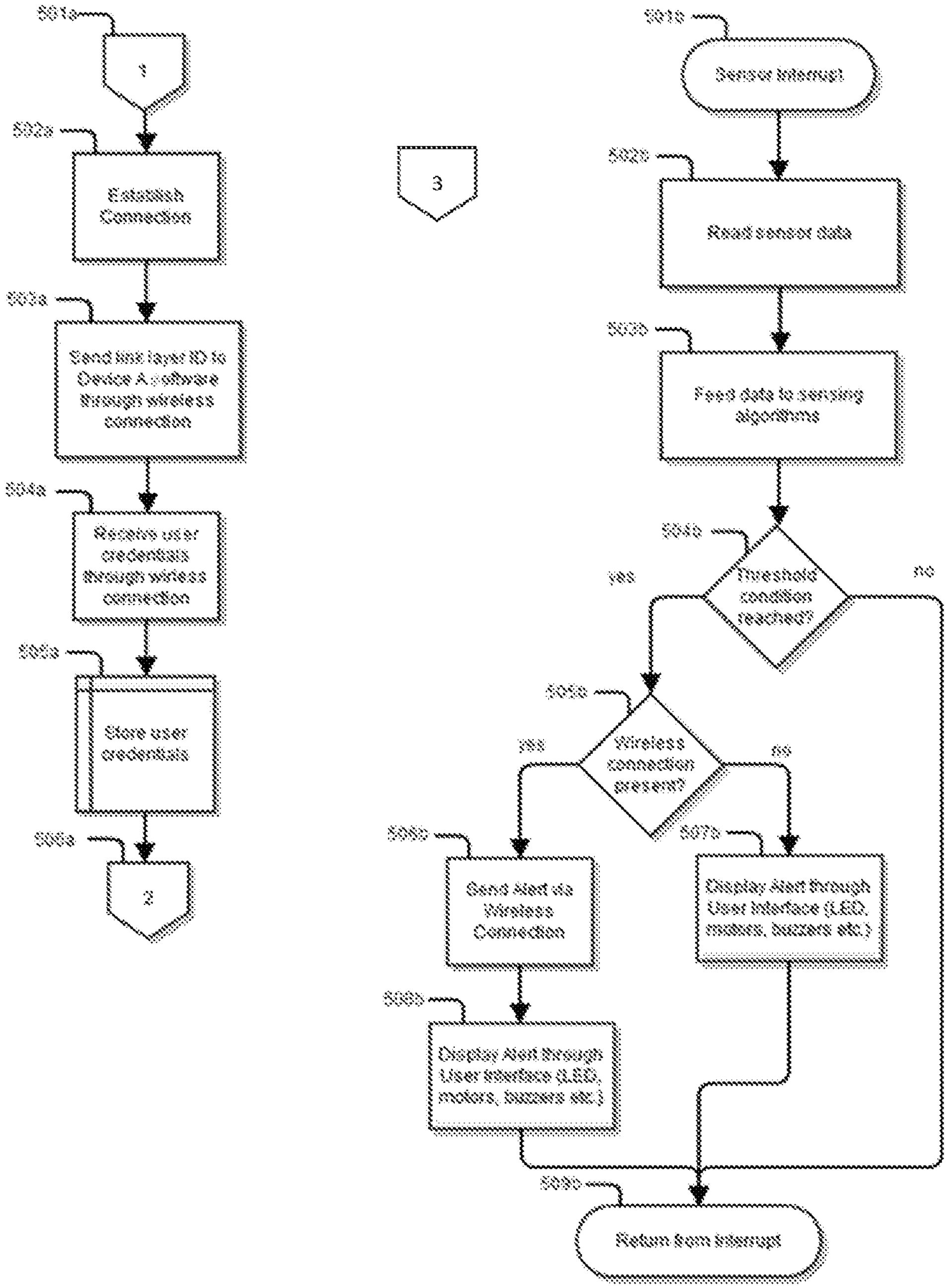
FIG. 5 is a flowchart illustrating further methods for operating a device in accordance with the present invention.

FIG. 5 shows a potential flow chart for a lock initial configuration. This allows the lock to store user credentials and to send its own hardware ID to the application so that it can be stored in back end servers under the owner's profile (501*a*-506*a*). Step 501*b* shows a sample interrupt flow chart for a sensor event. This can be used for example to detect lock tampering and display alerts through hardware and/or send wireless messages to alert the owner of potential damage or theft (501*b*-509*b*).

Figure 6:
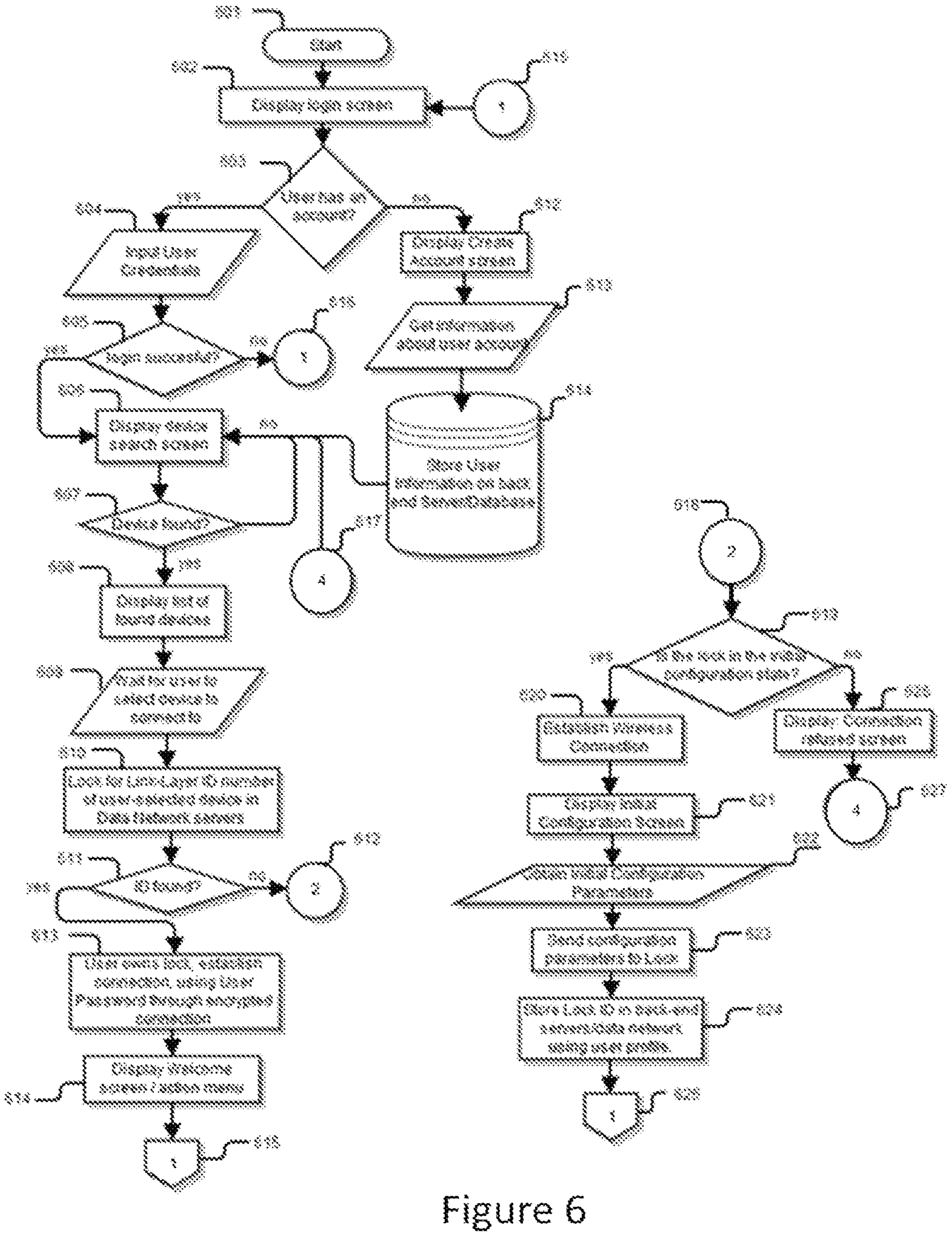
FIG. 6 is a flowchart illustrating a method for operating software in accordance with an embodiment of the present invention.

The software associated with device A can take many forms depending on the type of device being used to communicate with the wireless lock. In many cases it will be a mobile application running on a portable device such as a smart phone or media player with wireless capabilities. Device A software could also be a web browser application or a native application running on a phone, personal computer or portable device. An example of a software flowchart for an application that could be used can be seen in FIG. 6.

As soon as the application is started (601), a screen would shows a login screen to authenticate the user (602). If the user already has an account (603), the screen provides a way to input username and password (604). If the user does not have an account, the screen can provide an option to allow the user to create one. If this option is selected, the application shows another screen that takes user information (613), then stores it in a back end server/database (614). In the case that the user already has an account and inputs login credentials the system then proceeds to authenticate the identity of the user with data previously stored in the back end servers/databases. If the user authentication is successful (605), the application then displays a screen to search for nearby wireless locks (606). If the login attempt is not successful, the login screen indicates the failed attempt and prompt the user to try again (616).

The device search screen allows the user to search for nearby devices and list them once they are found (608). If no devices are found (607), the screen allows the user to keep searching until something is found. Once one or more devices are found, they are listed in the same or different screen. The user would then select the desired wireless lock to connect to (609). Once a device is selected from the list, the application could search for the Link Layer ID or similar hardware key from the selected device in the back end servers (610). If the hardware key is found on the online database (611) and the key is associated with the logged in user, then a wireless connection would be established between Device A and the wireless lock (613). In this case a welcome screen and/or a main action menu could be presented to the user (614). In the case that the hardware ID from the lock is not found on the database (612 to 618), and the lock is in an initial configuration state (619) either because it is new or because it has been reset, then the application would establish a wireless connection (620), and present to the user an initial lock configuration screen (621) where settings such as a name for the lock, wireless connectivity settings, sensitivity of sensors, LED brightness, and others could be set (622). Once the configuration settings are chosen, these would be stored in both the lock and the back end servers/databases (623,624). Finally, if the user selects a lock for which a hardware ID cannot be found under the associated profile, the connection would be refused and a connection refused screen could be shown (626) indicating the failure, and then proceed to the search device screen (627 to 617).

Figure 7:
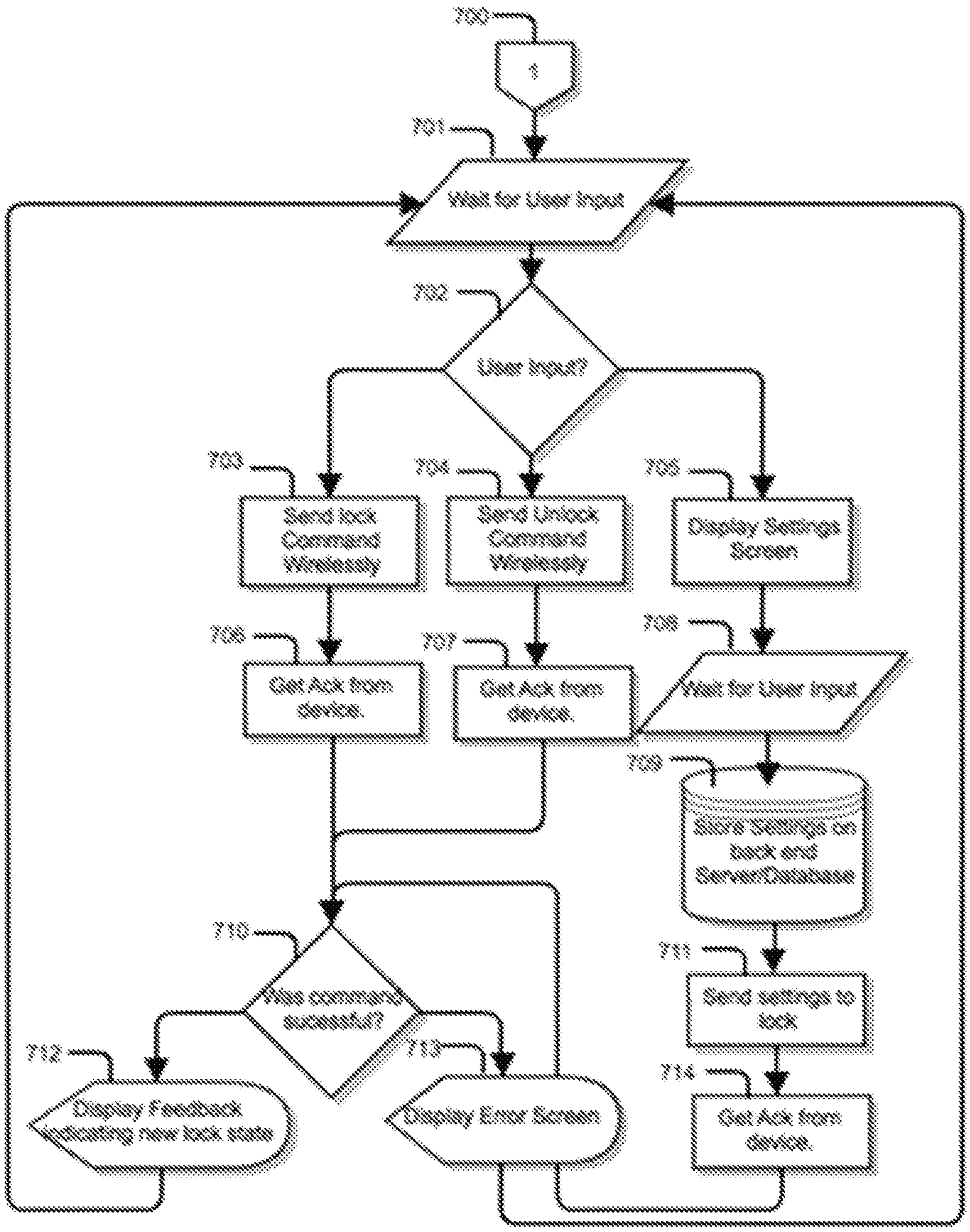
FIG. 7 is a flowchart illustrating the operation of a software application in accordance with an embodiment of the present invention.

Once a connection with the lock is established (615 or 625 to 700), the application may display a task menu through user interface elements such as icons, buttons and similar controls as illustrated in FIG. 7. This screen waits for the user to perform an action (701). If the user selects (702) locking, a wireless locking command would be sent to the lock (703). Once the lock performs the action, it would provide feedback to the application through an acknowledgement (706) and inform the application of the result of the action. If the action was successful (710) a user interface element could be displayed to provide feedback to the user about the new state of the lock (712) otherwise an error screen indicating the failure could be displayed (713). In the case that the user selects an unlock command, the application would send an unlock command (704), then wait for an acknowledgement (707) and then wait for the results of the action as with the locking command. Once again, user feedback would be provided through either software/hardware user interface elements indicating the result of the operation. Yet another possibility would be for the user to choose to configure the lock in which case a special lock configuration screen would be shown (705). Once the user inputs the new settings (708), these would be sent to the lock wirelessly, and to the online backend servers/databases for storage (709,711). An acknowledgement would work as feedback for the application to confirm that the settings were received and that they are correct (714). In a similar fashion to the other instructions, the result could be shown though hardware and/or software (710,712,713).

Figure 8A:
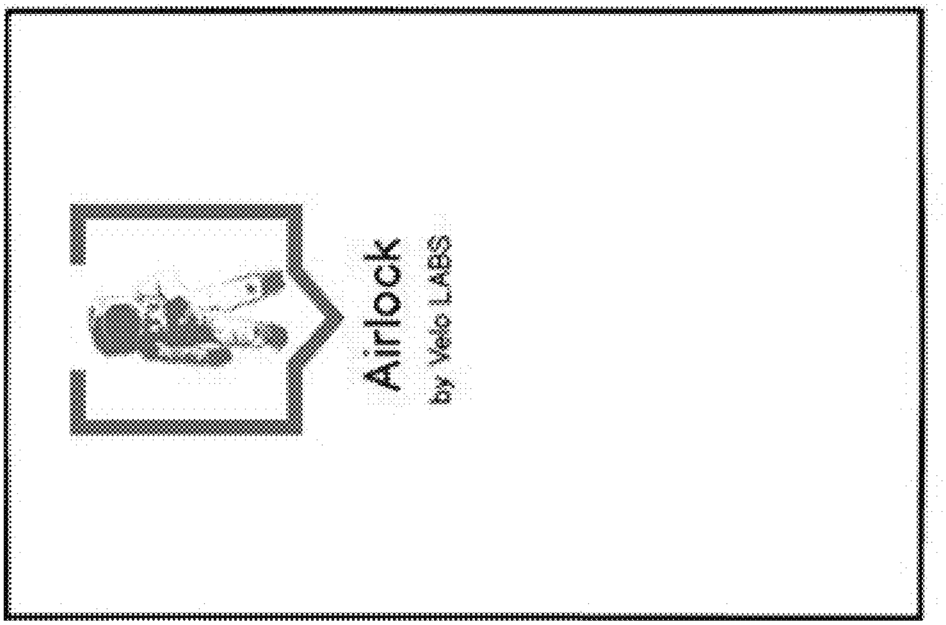
FIGS. 8*a-h* are screenshots of a software application in accordance with an embodiment of the present invention.
Figure 8B:
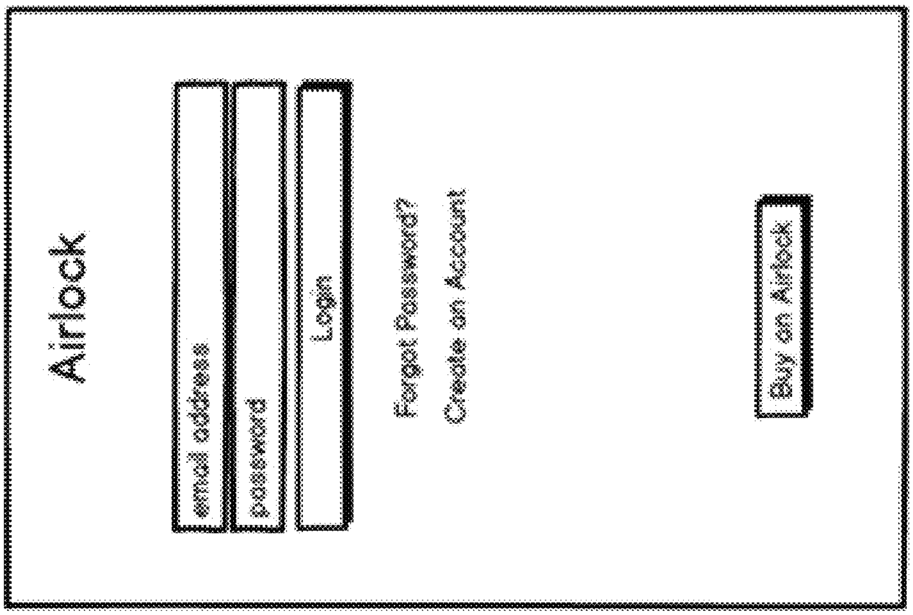

FIGS. 8*a*-*h* illustrate exemplary screenshots for an application running on a mobile device A. FIG. 8*a* shows an initial loading screen. FIG. 8*b* shows a login screen, which may further have options for creating an account or recovering lost credentials, as well as directing a user to an external resource (such as a website or shopping application) for purchasing a wireless locking device according to the present invention.

Figure 8C:
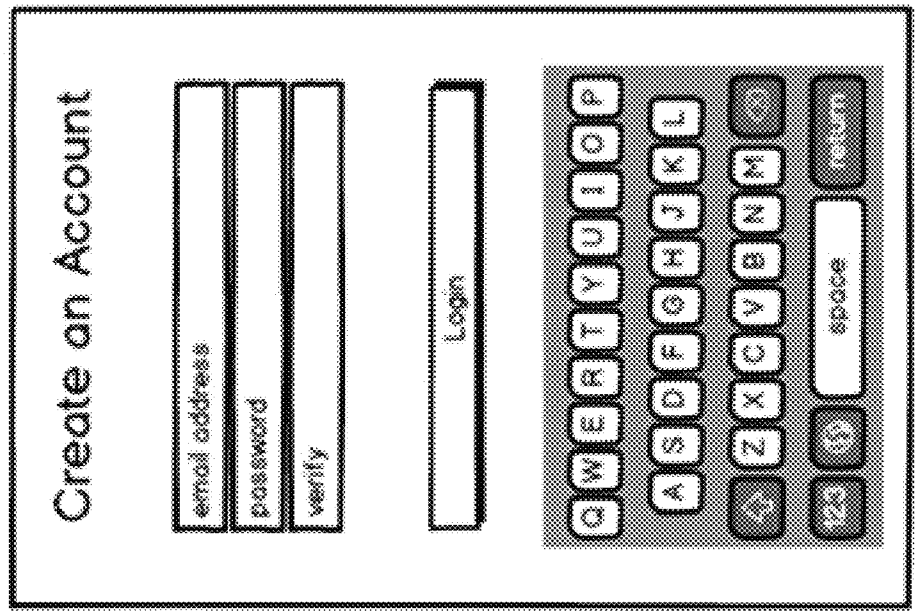
Figure 8D:
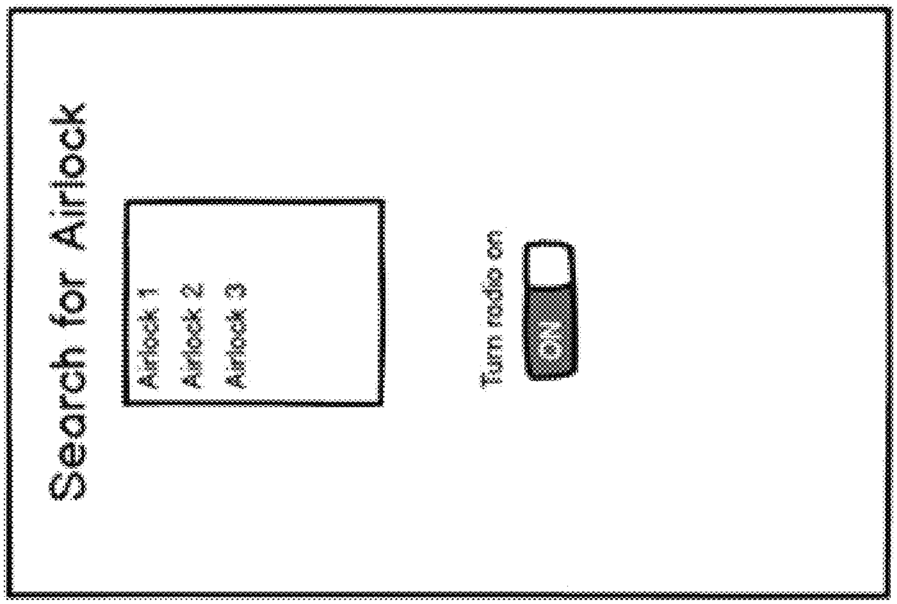

FIG. 8*c* shows an account creation screen including a virtual keyboard; other screens requiring user input may also include a virtual keyboard as necessary. FIG. 8*d*, which in some implementations may only be accessible after a successful login with an existing account, shows nearby wireless locking devices that the mobile device has detected and that the user is eligible to potentially communicate with. In some implementations, this may be fewer than the number of wireless locking devices physically present and may be limited by the user's credentials relative to the settings of the locking devices.

Figure 8F:
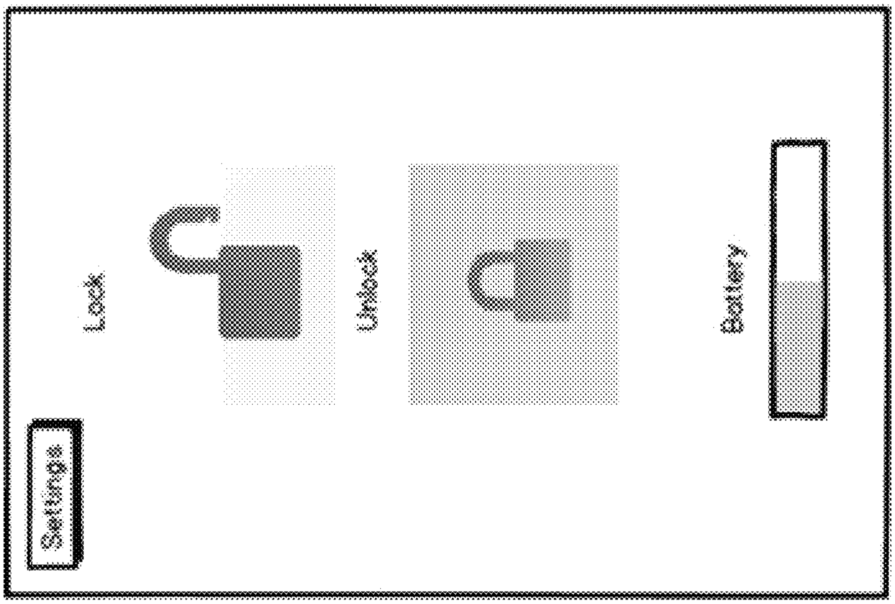
Figure 8E:
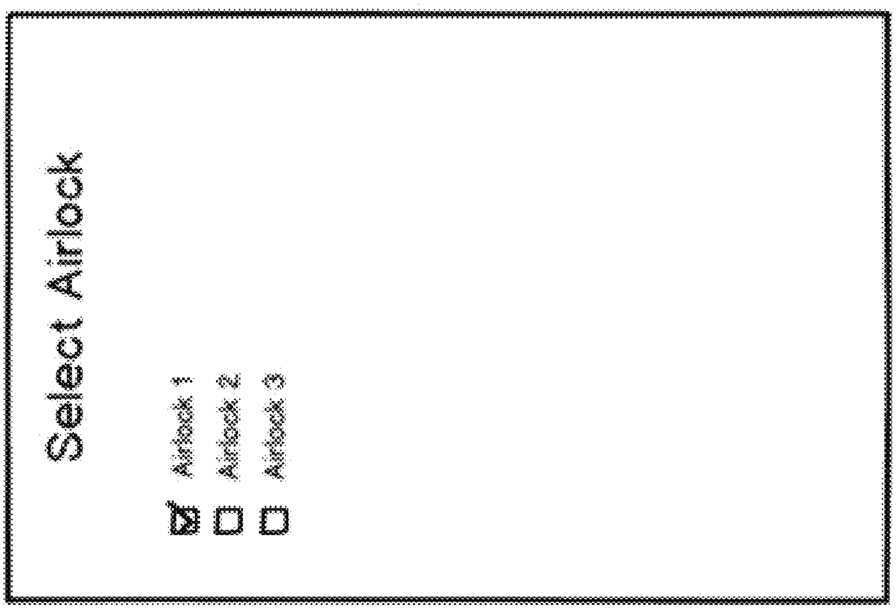

FIG. 8*e* provides a list of wireless locking devices from which a user selects one to communicate with. FIG. 8*f* shows a potential interface screen for the selected wireless locking device, including lock and unlock commands, a battery life indicator, and an option for configuring settings.

Figure 8G:
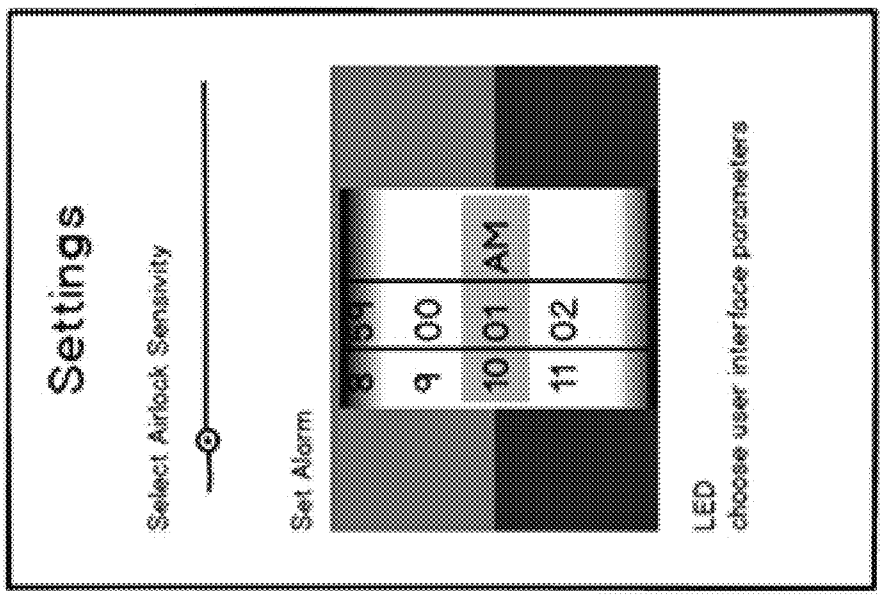
Figure 8H:
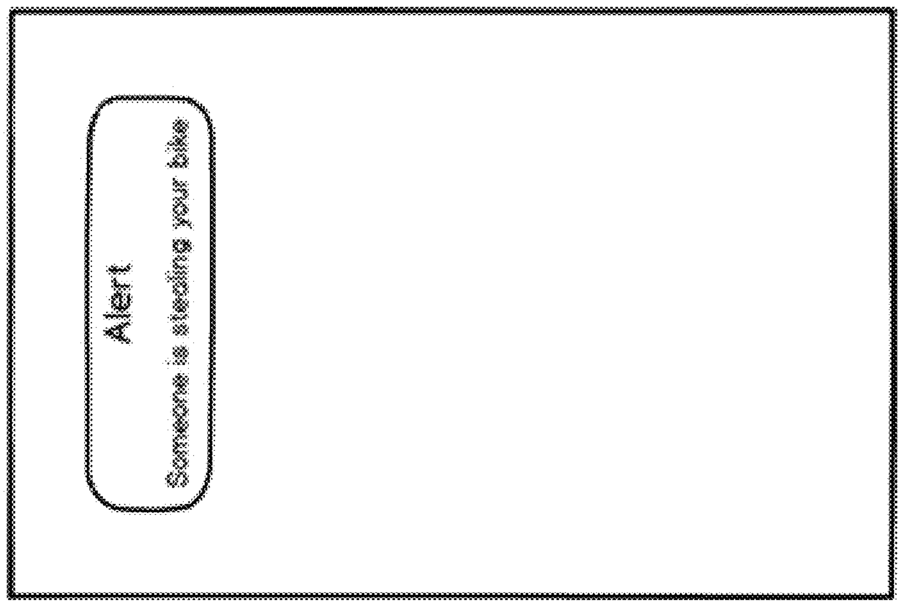

FIG. 8*g* illustrates a screen for adjusting a wireless lock screen's settings. FIG. 8*h* is an exemplary illustration of an alert that may "pop-up" or otherwise display on a mobile device when the locking mechanism detects an unauthorized event.

Figure 10A:
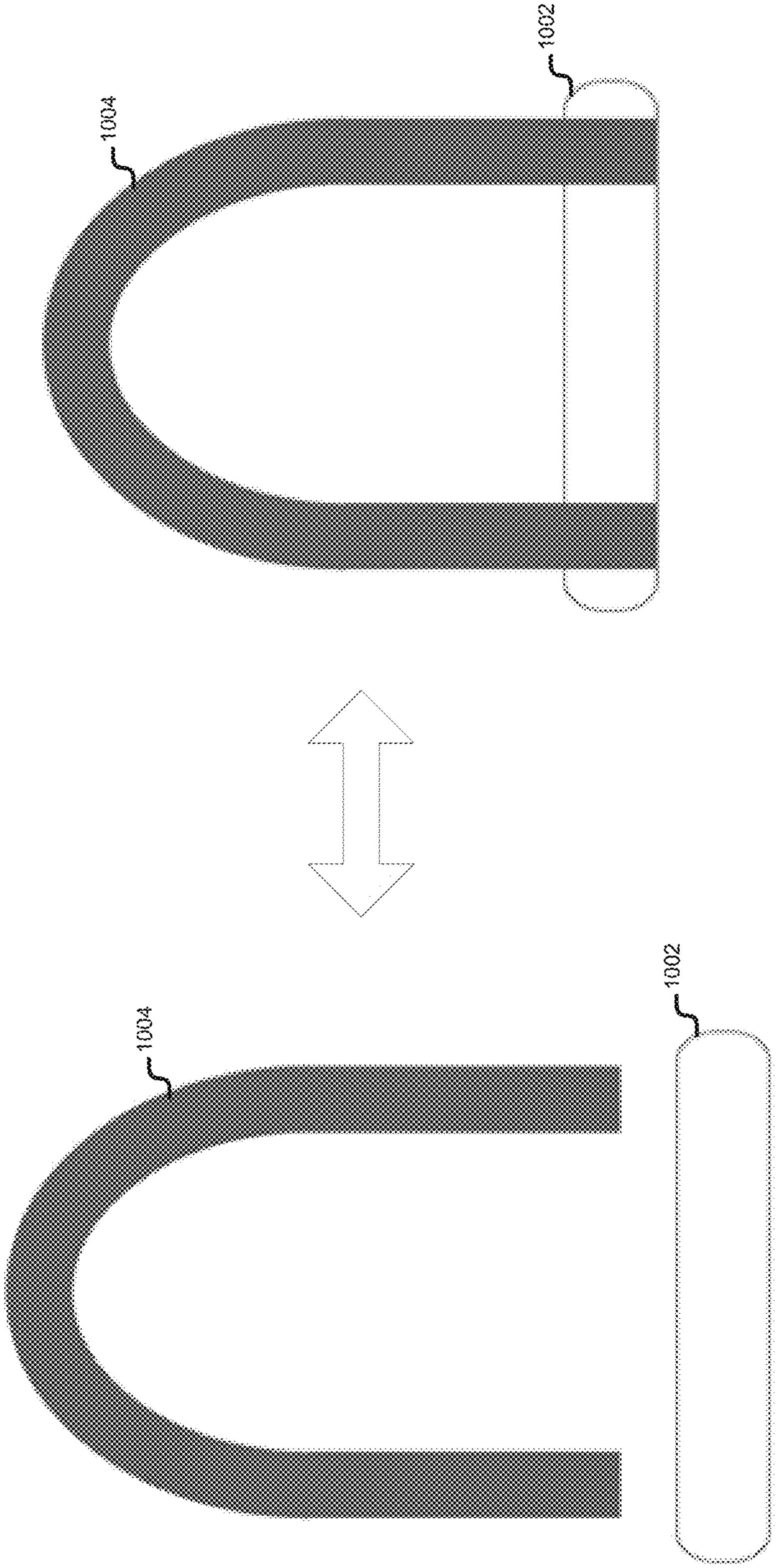
FIG. 10*a* is a diagrammatic illustration of a lock embodiment including a top-loaded locking bar.
Figure 10B:
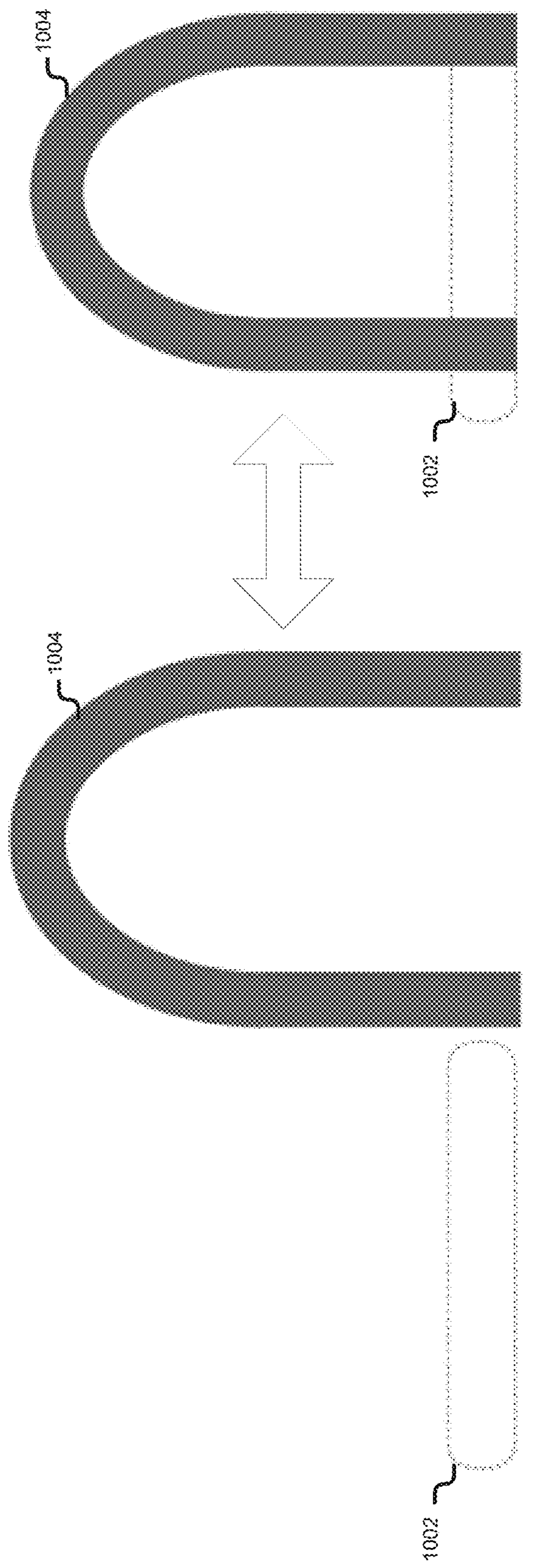
FIG. 10*b* is a diagrammatic illustration of a lock embodiment including a side-loaded locking bar.

FIGS. 10*a* and 10*b* show an embodiment of a u-shaped lock. Both the locking bar (1002) and the shackle (1004) shown in FIGS. 10*a*-*b* are preferably made from a heat-treated high-grade hardened steel, carbide, titanium alloy, ceramic, or composite aramid construction. The structures are sufficiently sturdy and thick to present effective resistance to the action of a bolt cutter, abrasion saw, cryogenic impact, or a lever. The locking bar (1002) preferably is of hollow tubular construction while the shackle (1004) may be made from a die formed, injection molded, or casted process. Alternatively, the shackle (1004) can be formed with different outer peripheries, such as rectangular, oval, pentagonal, hexagonal, or octagonal shape.

The lock comprises a u-shaped housing also known as a shackle (1004) and a locking bar (1002). The shackle (1004) may be closed using a top-loaded locking bar as shown in FIG. 10*a*, or it may be closed using a side-loaded locking bar as shown in FIG. 10*b*. In an example embodiment of a side loaded locking-bar as shown in FIG. 10*b*, the locking bar may be secured to the shackle by restraining pawls in a ratcheting motion as demonstrated in FIGS. 9*a*-*e*. The pawls are unrestrained to unlock the mechanism. In order to use the device, the object to be secured needs to be physically locked to some other object, such as a bike rack, flagpole, lamp post, tree, or the like. The electronic and mechatronic elements can be either fully housed in the shackle, fully housed in the locking bar or split amongst them. This means that different embodiments of the invention can be then created for different scenarios. In one example, both the shackle and locking bar are designed to fit one another mechanically. A different example would be to create a "smart" locking bar that is designed specifically to be used with pre-existing shackles, thus reducing the cost to manufacture and sell.

FIGS. 9*a*-*e* show several different types of mechanisms that can be used to lock and unlock the device.

Figure 9A:
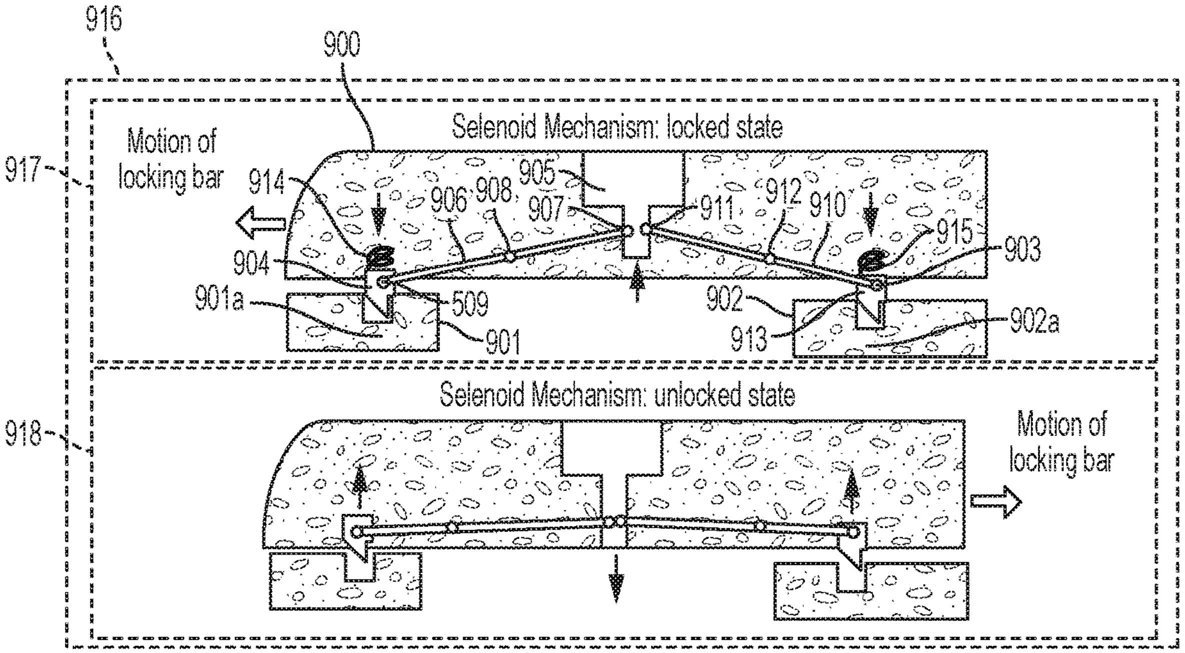
FIG. 9*a* is a cross-sectional diagram of a lock embodiment including a solenoid-actuated linkage mechanism.

An example embodiment of a solenoid actuated linkage mechanism can be seen in FIG. 9*a*. It is composed of a locking bar (900), left side of the shackle (901), right side of the shackle (902), right side pawl (903), left side pawl (904), solenoid (905), left side linkage (906), left side solenoid pin joint (907), left side fulcrum joint (908), left side pawl pin joint (909), right side linkage (910), right side solenoid pin joint (911), right side fulcrum joint (912), right side pawl pin joint (913), left side pawl spring (914), and the right side pawl spring (915). The entire mechanism is referred to as (916), the locked state as (917), and the unlocked state as (918). In this example, the mechanism is "fail secure", which means the mechanism is locked in the unpowered state. In the unlocked state (918), the solenoid (905) plunger is extended, and the linkage arms (906, 910) produce positive leverage to overcome the springs (914, 915) and retract the pawls (903, 904). In the locked state (917), the solenoid (905) plunger is retracted, and the linkage arms (906, 910) produce negative leverage to extend the pawls (903, 904) and lock them into the shackle teeth (901*a*, 902*a*).

Figure 9B:
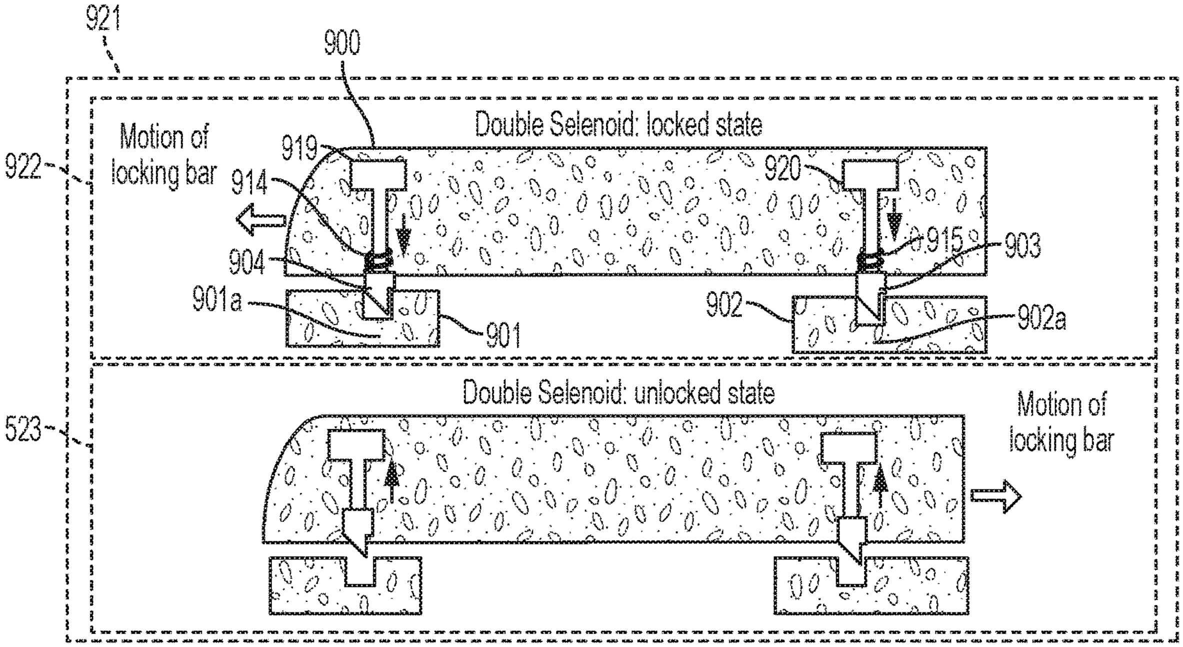
FIG. 9*b* is a cross-sectional diagram of a lock embodiment including a solenoid-actuated pawl-retracting mechanism.

Similarly, a dual-solenoid mechanism could be used as depicted on FIG. 9*b*. In the dual solenoid version (921), the locked and unlocked states (922,923) are controlled via two independently actuated solenoids (919, 920). To lock the device, the solenoid would push or pull a locking pin (904) into a notch (902*a*). A spring (914) would then return the locking pins to their original position, once the solenoid is not energized anymore. The entire mechanism is referred to as (921), the locked state as (922), and the unlocked state as (923).

Figure 9C:
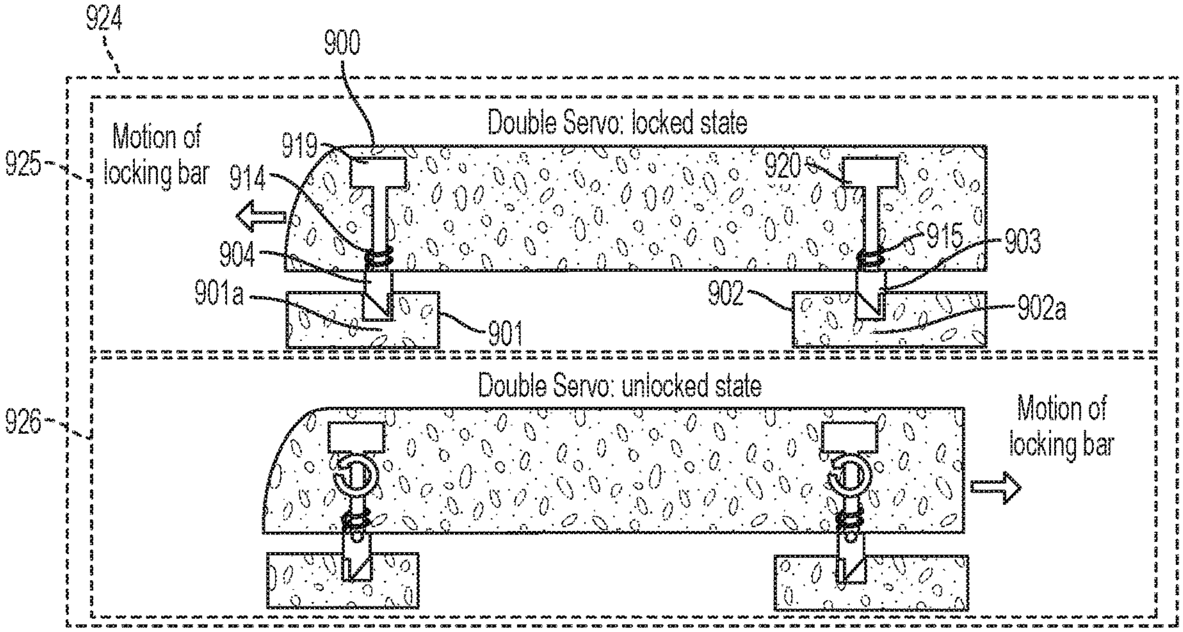
FIG. 9*c* is a cross-sectional diagram of a lock embodiment including a servo-actuated rotating-pawl mechanism.

An example embodiment of a servo actuated rotating-pawl mechanism can be seen in FIG. 9*c*. It is composed of a locking bar (900), left side of the shackle (901), right side of the shackle (902), right side pawl (903), left side pawl (904), left servo (919), right servo (920), left side pawl spring (914), and the right side pawl spring (915). The entire mechanism is referred to as (924), the locked state as (925), and the unlocked state as (926). In this example, the mechanism is "fail secure", which means the mechanism is locked in the unpowered state. In the unlocked state (926), the servos (919, 920) are actuated in the clockwise or counter-clockwise direction to rotate the pawls (903, 904) to the unlocked direction with respect to the left and right side teeth (901*a*, 902*a*). In the locked state, the servos (919, 920) are returned to their original position and the pawls spring back to the locking direction with respect to the shackle teeth (901*a*, 902*a*).

Figure 9D:
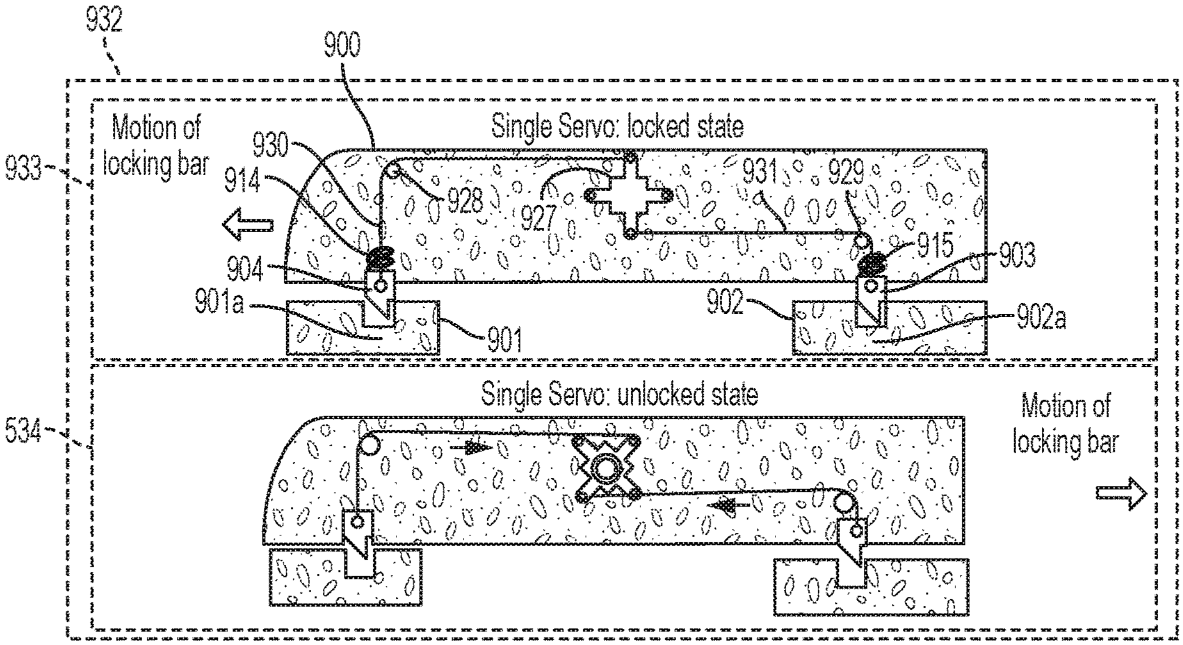
FIG. 9*d* is a cross-sectional diagram of a lock embodiment including a servo-actuated pawl-retracting mechanism.

An example embodiment of a servo actuated pawl-retracting mechanism can be seen in FIG. 9*d*. It is composed of a locking bar (900), left side of the shackle (901), right side of the shackle (902), right side pawl (903), left side pawl (904), left side pawl pin joint (909), left side pawl spring (914), right side pawl spring (915), servo (927), left side pin/pulley (928), right side pin/pulley (929), left side cable (930), right side cable (931). The entire mechanism is referred as (932), the locked state is referred as (933), and the unlocked state is referred as (934). In this example, the mechanism is "fail safe", which means the mechanism is unlocked in the unpowered state. In the unlocked state (934), the servo (927) is actuated in the clockwise or counterclockwise direction to retract the pawls (903, 904). In the locked state, the servo (927) is returned to its original position, and the pawl springs (914, 915) provide a force to retract the pawls (903, 904), and lock them into the shackle teeth (901*a*, 902*a*).

Figure 9E:
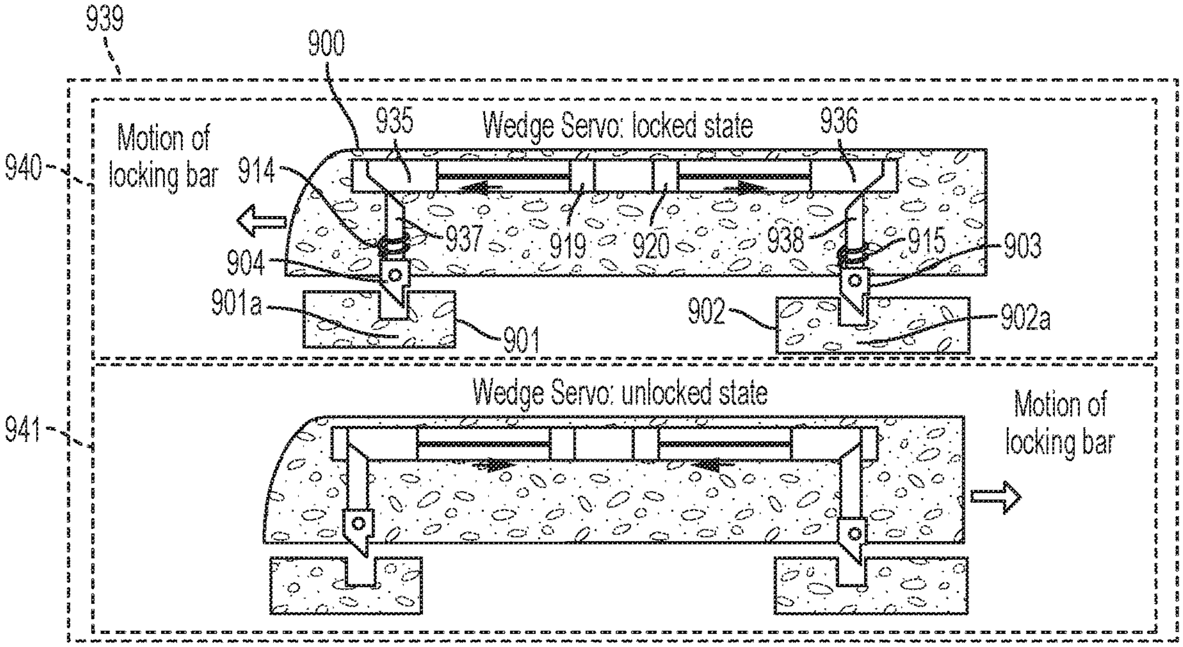
FIG. 9*e* is a cross-sectional diagram of a lock embodiment including a wedge mechanism.

FIG. 9*e* shows a wedge actuated mechanism. In this case a wedge (935, 936) is pushed out which in turn causes the locking pin (903, 904) to engage into the notch (902*a*, 902*b*). To unlock the device, the wedge (935, 936) would be retracted and a spring (914, 915) would return the locking pin (903, 904) to its original position. The entire mechanism is referred to as (939), the locked state as (940), and the unlocked state as (941).

Figure 11A:
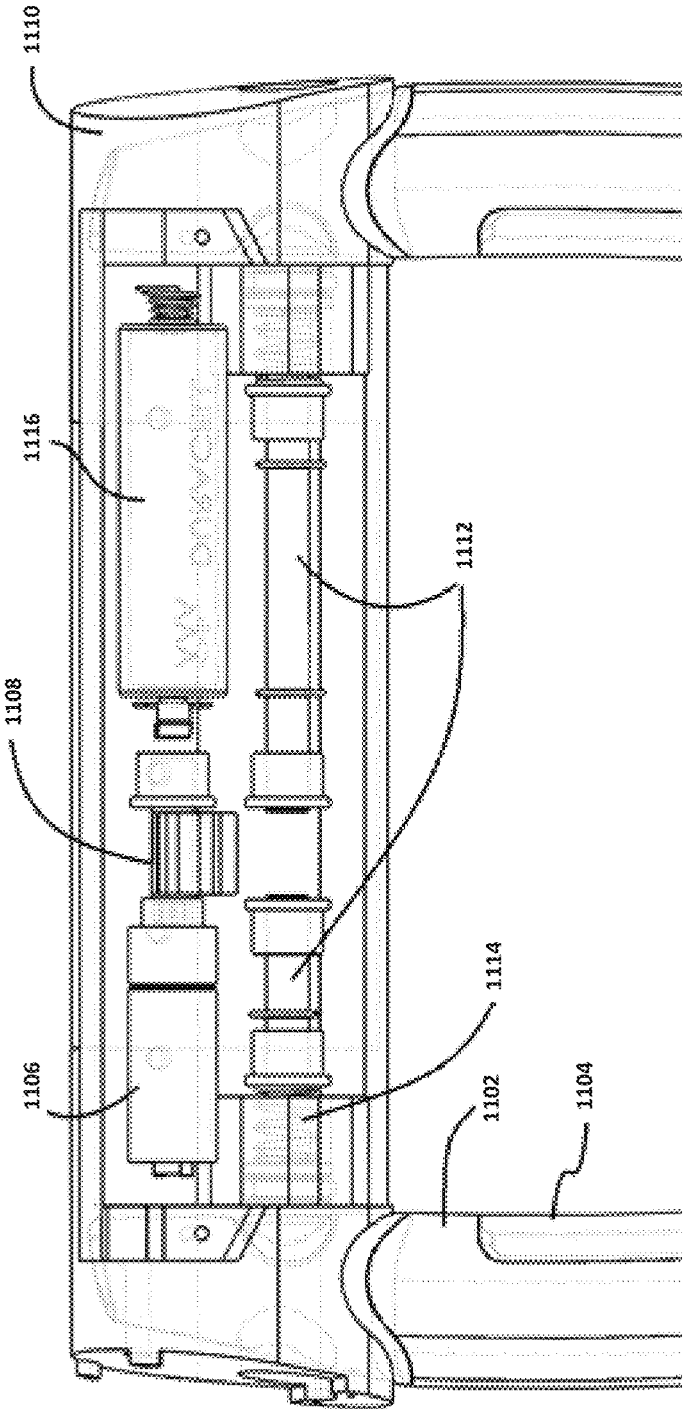
FIG. 11*a* is a cross-sectional view of a lock mechanism in the unlocked position.
Figure 11B:
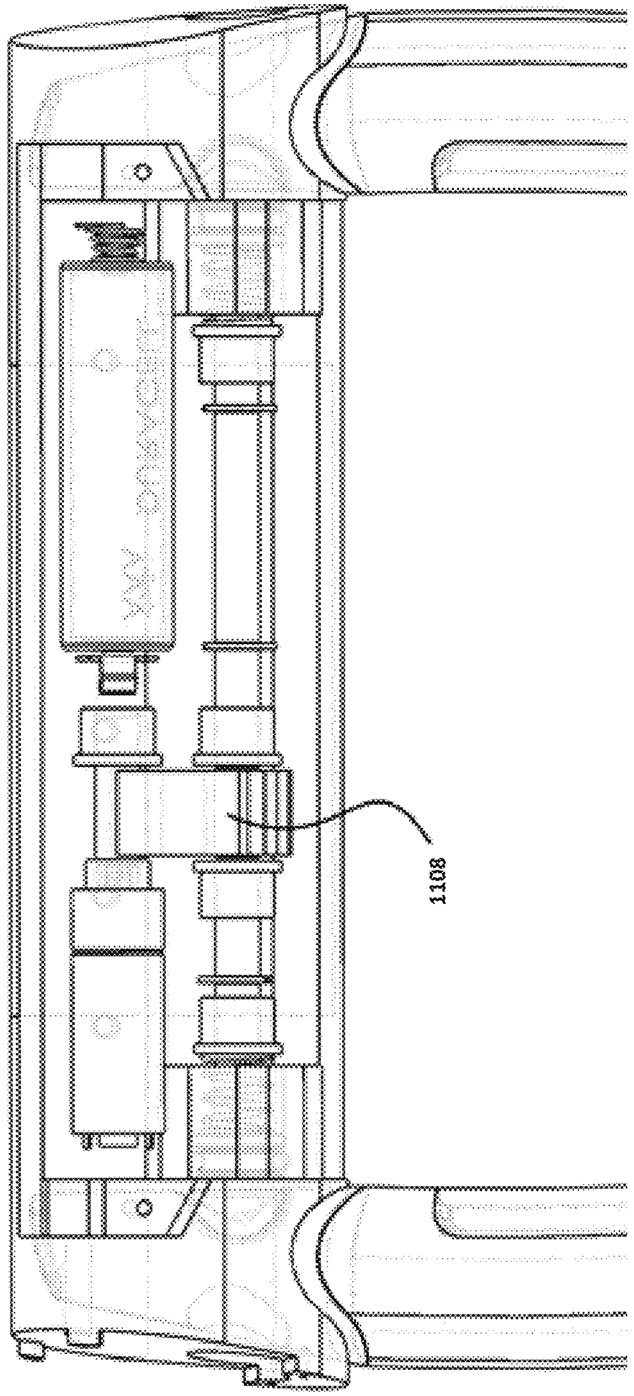
FIG. 11*b* is a cross-sectional view of a lock mechanism in the locked position.

FIGS. 11*a* and 11*b* provide a further implementation of a mechanical design of a wireless lock as disclosed. FIG. 11*a* shows the "open" state of the lock. FIG. 11*b* shows the "locked" state. In order to lock the device, a user would need to insert the shackle (1102,1104) into the lockbar (1110). In order for the shackle to be inserted, the user needs to push it in, causing both spring loaded locking pins (1112) to move inwards. Once the shackle is fully inserted, the springs (1114) cause both locking pins (1112) to engage into a notch in the shackle. A motor (1106) then rotates a locking latch (1108), which blocks the space needed for the locking pins to move. This effectively locks the device. In order to open the device, the motor would rotate the locking latch away creating the opening needed for the pins to move inwards. The springs ensure that even in the "open" position, the lock itself does not fall apart, requiring the user to pull the shackle out of the locking bar by overcoming the force of both springs. A rechargeable battery (1116) is the power supply for the entire device.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

The invention claimed is:

1. A computer-implemented method, comprising:

identifying, at an electronic device, an authenticated connection between the electronic device and a lock apparatus, the authenticated connection comprising at least one wireless link;

receiving, at the electronic device from the lock apparatus, via the authenticated connection, an alert based on an unauthorized event at the lock apparatus, wherein the lock apparatus is configured to display the alert via a user interface of the lock apparatus without transmitting the alert to the electronic device when the at least one wireless link is unavailable;

in response to receiving the alert, displaying, at the electronic device, via a graphical user interface, a message notifying a user of the unauthorized event.

2. The computer-implemented method of claim 1, wherein displaying the message comprises overlaying a pop-up message on the graphical user interface.

3. The computer-implemented method of claim 2, wherein the pop-up message is overlaid on a portion of the graphical user interface that occupies less than a total area of the graphical user interface.

4. The computer-implemented method of claim 1, wherein the alert is received based on the unauthorized event triggering an interrupt at the lock apparatus.

5. The computer-implemented method of claim 1, wherein the lock apparatus is configured to display a second alert based on the unauthorized event.

6. The computer-implemented method of claim 5, wherein the second alert is displayed via an output element of the lock apparatus comprising one or more of a light emitting diode, a motor, or a buzzer.

7. The computer-implemented method of claim 1, wherein the electronic device includes one or more of a cellular phone, a smart phone, a media device, a pager, a portable computer, a personal computer, a tablet computer, a personal digital assistant, or a wearable computer.

8. The computer-implemented method of claim 1, wherein the at least one wireless link includes at least one of a Bluetooth link, a Wi-Fi link, a near field communication (NFC) link, a ZigBee link, or an ANT link.

9. The computer-implemented method of claim 1, wherein identifying the authenticated connection comprises:

establishing, at the electronic device, a first connection with the lock apparatus;

retrieving, at the electronic device from a database, credentials;

submitting, from the electronic device to the lock apparatus, via the first connection, the credentials.

10. An electronic device for communicating with a lock apparatus, comprising:

a memory; and a processor coupled with the memory, the processor being configured to read instructions from the memory that, when executed, cause the processor to:

identify an authenticated communication path between the electronic device and the lock apparatus, the authenticated communication path comprising one or more wireless links;

receive, from the lock apparatus, via the authenticated communication path, an alert based on an unauthorized event at the lock apparatus, wherein the lock apparatus is configured to display the alert via a user interface of the lock apparatus without transmitting the alert to the electronic device when the at least one wireless link is unavailable;

in response to receiving the alert, displaying, via a graphical user interface, a message notifying a user of the unauthorized event.

11. The electronic device of claim 10, wherein displaying the message comprises overlaying a pop-up message on the graphical user interface.

12. The electronic device of claim 11, wherein the pop-up message is overlaid on a portion of the graphical user interface that occupies less than a total area of the graphical user interface.

13. The electronic device of claim 10, wherein the alert is received based on the unauthorized event triggering an interrupt at the lock apparatus.

14. The electronic device of claim 10, wherein the lock apparatus is configured to display a second alert based on the unauthorized event.

15. The electronic device of claim 14, wherein the second alert is displayed via an output element of the lock apparatus comprising one or more of a light emitting diode, a motor, or a buzzer.

16. The electronic device of claim 10, wherein the electronic device includes one or more of a cellular phone, a smart phone, a media device, a pager, a portable computer, a personal computer, a tablet computer, a personal digital assistant, or a wearable computer.

17. The electronic device of claim 10, wherein the at least one wireless link includes at least one of a Bluetooth link, a Wi-Fi link, a near field communication (NFC) link, a ZigBee link, or an ANT link.

18. The electronic device of claim 10, wherein identifying the authenticated connection comprises:

establishing, at the electronic device, a first connection with the lock apparatus;

retrieving, at the electronic device from a database, credentials;

submitting, from the electronic device to the lock apparatus, via the first connection, the credentials.

19. A non-transitory computer-readable medium storing instructions that, when executed by one or more hardware processors, cause the one or more hardware processors to perform a method comprising:

identifying, an authenticated connection between the electronic device and a lock apparatus, the authenticated connection comprising at least one wireless link;

receiving, from the lock apparatus, via the authenticated connection, an alert based on an unauthorized event at the lock apparatus, wherein the lock apparatus is configured to display the alert via a user interface of the lock apparatus without transmitting the alert to the electronic device when the at least one wireless link is unavailable;

in response to receiving the alert, displaying, via a graphical user interface, a message notifying a user of the unauthorized event.

20. The non-transitory computer-readable medium of claim 19, wherein displaying the message comprises overlaying a pop-up message on the graphical user interface.

* * * * *